(12) United States Patent
Addiego et al.

(10) Patent No.: US 8,956,484 B2
(45) Date of Patent: Feb. 17, 2015

(54) METHOD FOR BONDING ZIRCON SUBSTRATES

(71) Applicants: William Peter Addiego, Big Flats, NY (US); Michael John Bennett, Corning, NY (US); Michael Patrick Carson, Corning, NY (US); Jeffrey Scott Davis, Corning, NY (US); Martin Herbert Goller, Campbell, NY (US); Benjamin Zain Hanson, Big Flats, NY (US); Tracey Lynn Timmons, Big Flats, NY (US)

(72) Inventors: William Peter Addiego, Big Flats, NY (US); Michael John Bennett, Corning, NY (US); Michael Patrick Carson, Corning, NY (US); Jeffrey Scott Davis, Corning, NY (US); Martin Herbert Goller, Campbell, NY (US); Benjamin Zain Hanson, Big Flats, NY (US); Tracey Lynn Timmons, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 127 days.

(21) Appl. No.: 13/685,149

(22) Filed: Nov. 26, 2012

(65) Prior Publication Data

US 2014/0144571 A1    May 29, 2014

(51) Int. Cl.
*C03B 29/00*  (2006.01)
*C04B 37/00*  (2006.01)
*B29C 65/00*  (2006.01)
*C03B 9/00*   (2006.01)
*C03B 11/08*  (2006.01)

(52) U.S. Cl.
CPC .................................. *C04B 37/001* (2013.01)
USPC .......... 156/89.11; 156/153; 264/248; 65/227; 65/374.1

(58) Field of Classification Search
USPC ........ 156/89.11, 89.12, 252, 253, 153, 272.2, 156/325, 281, 154, 87, 309.6; 264/248
See application file for complete search history.

(56) References Cited

U.S. PATENT DOCUMENTS

| | | | |
|---|---|---|---|
| 3,338,696 A | 8/1967 | Dockerty | 65/145 |
| 3,682,609 A | 8/1972 | Dockerty | 65/83 |
| 4,925,608 A * | 5/1990 | Rossi et al. | 156/89.28 |
| 7,988,804 B2 | 8/2011 | Addiego et al. | 156/89.28 |
| 2001/0036054 A1* | 11/2001 | Chazono et al. | 361/321.2 |
| 2012/0196105 A1* | 8/2012 | Sanghera et al. | 428/215 |

FOREIGN PATENT DOCUMENTS

| | | | | |
|---|---|---|---|---|
| CN | CN101108775 A | | 1/2008 | C04B 35/66 |
| JP | 08118467 A | * | 5/1996 | |
| WO | 2009-142695 A2 | | 11/2006 | |

(Continued)

OTHER PUBLICATIONS

Tada et al., JP 08-118467 machine translation, Published May 14, 1996.*

(Continued)

*Primary Examiner* — Alex Efta
(74) *Attorney, Agent, or Firm* — Kevin M. Able

(57) ABSTRACT

Disclosed herein are methods for bonding refractory substrates, such as zircon substrates, without the use of a bonding agent. Exemplary methods include (a) providing a plurality of refractory components, each component having at least one surface to be bonded, (b) polishing each surface to be bonded to a surface roughness ($R_a$) of 200 nm or finer, (c) contacting the surfaces to be bonded to form an unbonded refractory substrate, (d) firing the unbonded refractory substrate, and (e) subjecting the surfaces to be bonded to a compressive force during firing. Methods for making refractory forming bodies are also disclosed herein.

23 Claims, 9 Drawing Sheets

(56) References Cited

FOREIGN PATENT DOCUMENTS

| WO | WO2009070230 | A1 | 6/2009 | ............. C04B 41/45 |
| WO | WO2009134411 | | 11/2009 | ............. C04B 37/00 |
| WO | WO 2009134411 | A2 * | 11/2009 | |
| WO | 2011-106221 | A1 | 9/2011 | |
| WO | 2011-150189 | A2 | 12/2011 | |
| WO | 2012-148642 | A2 | 11/2012 | |

OTHER PUBLICATIONS

WO/PCT—Notification of Transmittal of the International Seach Report and The Written Opinion of the International Searching Authority, or the Declaration—Dated: Feb. 27, 2014.

* cited by examiner

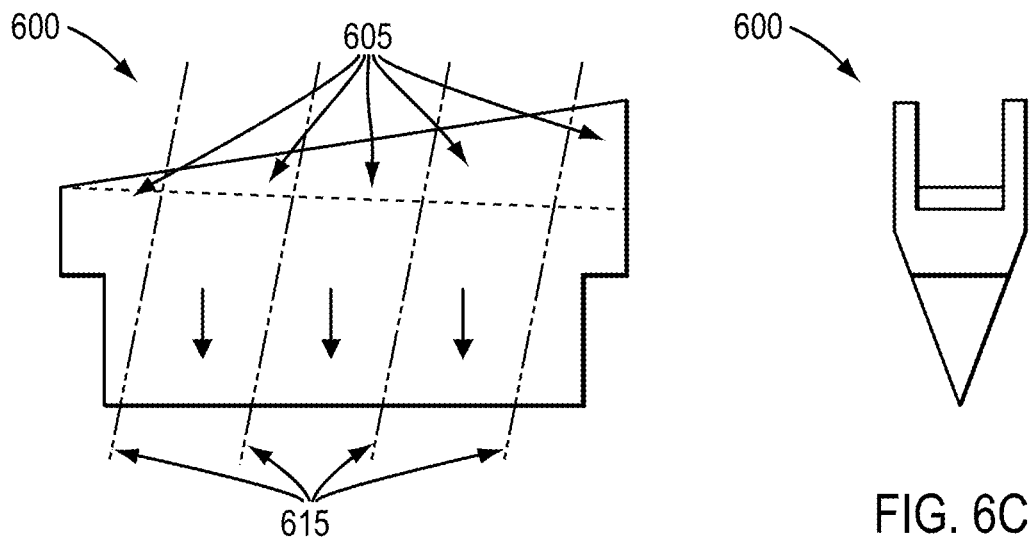
FIG. 6A
FIG. 6C
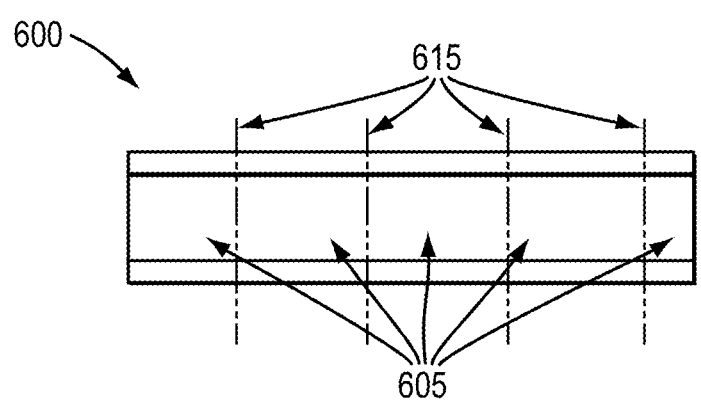
FIG. 6B

METHOD FOR BONDING ZIRCON SUBSTRATES

FIELD OF THE DISCLOSURE

The disclosure relates generally to methods for bonding refractory components together, without the use of a bonding agent, to form a larger refractory substrate. The refractory substrate may be useful in making refractory forming bodies for fusion down-drawn processes in the manufacture of high-precision glass substrates, such as liquid crystal displays (LCDs) and plasma displays.

BACKGROUND

Currently marketed high-performance display devices, such as liquid crystal and plasma displays, typically employ two high-precision glass sheets, one as a substrate for the electronic circuit components and the other as a substrate for a color filter. The leading technology for making such high-quality glass substrates is the overflow fusion down-draw process, developed by Corning Incorporated, and described, e.g., in U.S. Pat. Nos. 3,338,696 and 3,682,609.

The fusion down-draw process typically utilizes a forming body comprising an upper trough portion comprising two upper trough walls and a trough bottom and a lower portion having a wedge-shaped cross-section with two major side surfaces sloping downwardly to join at a root. The upper trough walls and the major side surfaces of the lower portion form two continuous forming surfaces which join at the root. During operation, molten glass is filled in the upper trough and allowed to overflow the top surfaces (or weirs) of the trough, down along the two forming surfaces, ultimately converging at the root to form a unitary glass ribbon with two pristine external surfaces that have not been exposed to the surface of the forming body. The ribbon is drawn down and cooled to form an elastic glass sheet having a desired thickness and a pristine surface quality.

Consumer demand for high-performance displays with ever growing size and image quality requirements poses a challenge in terms of the manufacturing processes employed to produce large pristine glass sheets. The larger the glass substrate, the larger the forming body must be to manufacture the substrate. Traditionally, forming bodies are formed by cold isostatically pressing a single, unitary piece of refractory material, such as zircon. Understandably, larger isostatic presses are required to make larger forming bodies from a unitary refractory material. However, when taking into account the size reduction caused by the shrinkage of the green refractory during firing and the subsequent machining of the refractory substrate to produce the forming body, the size of the isopress required can become significantly greater as the desired size of the forming body increases. The high capital investment in such large isopresses may be cost-prohibitive, especially for larger glass substrates, such as Gen-10 (2850×3050 mm) and above.

Thus, there is a need in the industry for efficient and cost-effective processes for making larger refractory substrates from which larger forming bodies can be machined. U.S. Pat. No. 7,988,804 proposes methods for the manufacture of larger zircon blocks comprising bonding several smaller zircon components together using a bonding agent. However, while these methods have resulted in a marked improvement in the industry, such methods still have certain drawbacks, such as decreased strength, incompatibility, corrosion, and streaking issues. The methods disclosed herein may provide larger refractory substrates without the aforementioned drawbacks.

SUMMARY

The disclosure relates, in various embodiments, to methods for making large refractory substrates, such as zircon substrates, by bonding several refractory components together without the use of a bonding agent. According to one embodiment, a zircon substrate is formed by bonding together a plurality of zircon components, each component having at least one surface to be bonded, the method comprising (a) polishing each surface to be bonded to a surface roughness ($R_a$) of 200 nm or finer, (b) directly contacting the surfaces to be bonded to form an unbonded zircon substrate, (c) firing the unbonded zircon substrate, and (d) subjecting the surfaces to be bonded to a compressive force during firing. In certain embodiments, the unbonded zircon substrate is fired at a temperature and for a time sufficient to sinter the zircon components and effect bonding at the surfaces.

Another embodiment of the disclosure relates to a method for forming a refractory substrate by bonding together a plurality of refractory components, each component having at least one surface to be bonded, the method comprising (a) polishing each surface to be bonded to a surface roughness ($R_a$) of 200 nm or finer, (b) contacting the surfaces to be bonded to form an unbonded refractory substrate, (c) firing the unbonded refractory substrate, and (d) subjecting the surfaces to be bonded to a compressive force during firing, wherein the unbonded refractory substrate is fired at a temperature and for a time sufficient to sinter the refractory components and effect bonding at the surfaces. In various embodiments, the refractory material may be chosen, for example, from zircon or alumina.

A further embodiment of the disclosure relates to a method for making a refractory forming body, such as a zircon forming body, comprising (a) preparing a refractory substrate by bonding together a plurality of refractory components, each component having at least one surface to be bonded, wherein the bonding comprises (i) polishing each surface to be bonded to a surface roughness ($R_a$) of 200 nm or finer, (ii) directly contacting the surfaces to be bonded to form an unbonded refractory substrate, (iii) firing the unbonded refractory substrate, and (iv) subjecting the surfaces to be bonded to a compressive force during firing, and (b) machining the refractory substrate into a desired shape and dimension to form the refractory forming body. In certain embodiments, the unbonded refractory substrate is fired at a temperature and for a time sufficient to sinter the refractory components and effect bonding at the surfaces. The refractory components may, in various embodiments, be zircon components or alumina components.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding of the disclosure, and are incorporated in and constitute a part of this specification. The drawings illustrate one or more exemplary embodiments and, together with the description, serve to explain the principles and operation of the various embodiments.

FIG. 6A is a side view of a forming body manufactured using a method according to the disclosure.

FIG. 6B is a top view of a forming body manufactured using a method according to the disclosure.

FIG. 6C is an end view of a forming body manufactured using a method according to the disclosure.

DETAILED DESCRIPTION

According to various embodiments of the disclosure, a larger refractory substrate may be produced by bonding together at least two smaller refractory components, without the use of a bonding agent. For example, two or more refractory components may be polished and/or otherwise prepared, brought into contact, and fired under a load, to produce a single refractory substrate. Thus, the methods of the instant disclosure may allow for the production of large-scale forming bodies, such as for the forming of glass substrates, without the increased costs associated with upgrading the required isostatic pressing equipment. While the instant disclosure envisions the manufacture of forming bodies for the production of larger glass substrates such as Gen-10 and above, it should be noted that the methods disclosed herein may also be used for the manufacture of smaller glass substrates, such as Gen-8 (2200×2500 mm) and below, which could otherwise be manufactured using the unitary isopressing approach.

The methods disclosed herein may provide an improvement over prior art methods at least because the instant methods do not require a bonding agent. Bonding agents typically require a chemical reaction to occur between their constituents and the refractory components to form an effective bond. If the reaction successfully proceeds to the point at which all of the bonding agent has reacted, a junction or joint comprising a thin layer of reactants will be formed between the refractory components. However, if the bonding agent is applied in a layer that is too thick, it may not completely react with the refractory material, thereby resulting in one or more intermediate phases that may compromise the strength of the bond. In addition, either the unreacted material or the expected reaction product might exhibit an enhanced or reduced corrosion by the molten glass during operation due to differential solubilities of the refractory or the reactants in the glass.

Figure 1:
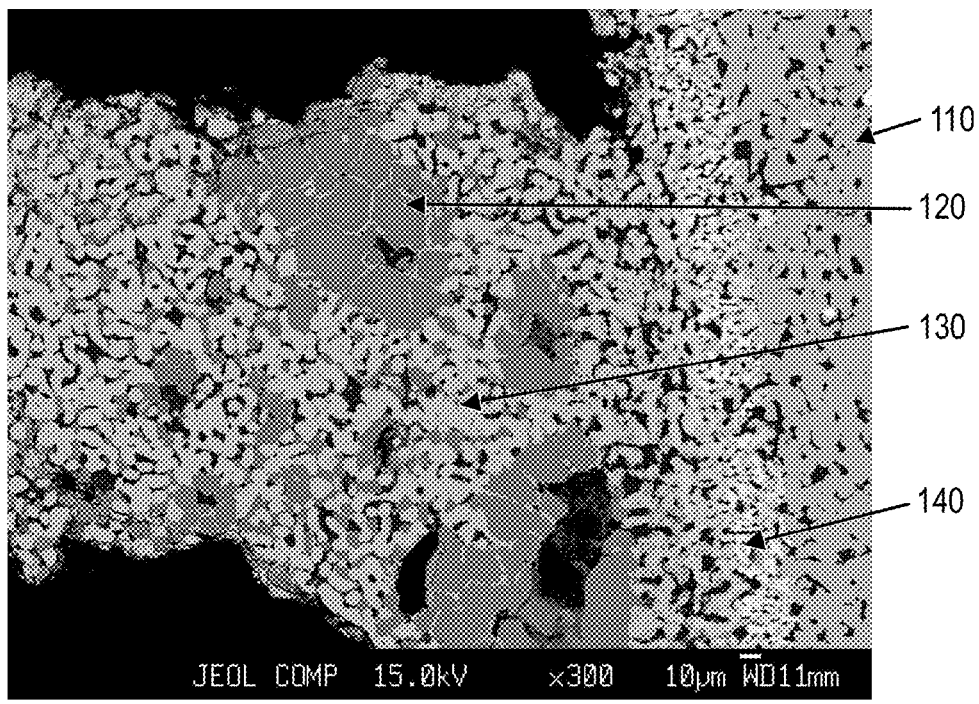
FIG. 1 is a backscattered electron image of two zircon components bonded together using a prior art method.

FIG. 1 illustrates a backscattered electron image taken using a scanning electron microscope (SEM) of a failed bond between two zircon components using a bonding agent according to prior art methods. The bonding failure may, for example, have been the result of an anomalously thick layer of bonding agent. The zircon refractory material to be bonded 110 is shown on the right of the image. The bonding agent incompletely reacted with the zircon refractory 110 to form a mixture of zirconia-rich titania 120 and zirconium titanate 130. The presence of multiple bonding phases may result in weak bonding, phase incompatibility, and/or corrosion issues. A complete reaction and, thus, a more successful bonding would be indicated by a thin layer of titanium-rich zirconia 140, without the presence of the intermediate phases 120 and 130.

Without wishing to be bound by theory, it is believed that the instant methods may reduce or even eliminate compatibility and/or corrosion issues because the molten glass will contact only the refractory material, without the presence of a distinct bonding agent phase. Furthermore, a refractory substrate or forming body manufactured according to the methods of the instant disclosure may exhibit improved strength, such as MOR strength, due to the absence of a bonding agent joint. In certain embodiments, the refractory substrate or forming body may also have improved thermal shock properties, because there is no bonding agent and, thus, no difference in the thermal properties and/or behavior of the bonding agent and the refractory material, e.g., during firing or operation.

Figure 2A:
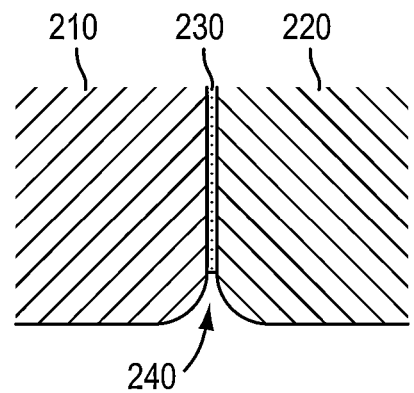
FIG. 2A is a graphic representation of two refractory components bonded together using a prior art method
Figure 2B:
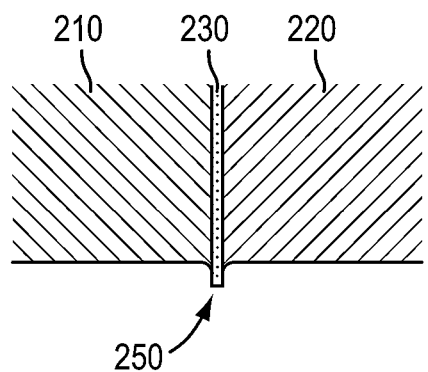
FIG. 2B is a graphic representation of two refractory components bonded together using a prior art method.

Another potential problem associated with the use of bonding agents is varying glass corrosion behavior. For example, if the joint material corrodes more or less readily than the refractory material during operation, the resulting glass sheet may have streak lines or thickness band variations. FIGS. 2A and 2B illustrate two potentially problematic wear patterns associated with the use of a bonding agent.

In FIG. 2A, two refractory components 210 and 220 are joined by a bonding agent 230. In this case, the bonding agent 230 has a higher solubility in glass, i.e., higher corrosion, than the refractory components 210 and 220. Thus, the bonded substrate in FIG. 2A will eventually, after time and use, develop a dip 240, which will cause streaking in the final glass product. In FIG. 2B, two refractory components 210 and 220 are joined by a bonding agent 230. In this case, the bonding agent 230 has a lower solubility in glass, i.e., lower corrosion, than the refractory components 210 and 220. Thus, the bonded substrate in FIG. 2B will eventually, after time and use, develop a ridge 250, which will cause streaking in the final glass product.

Figure 2C:
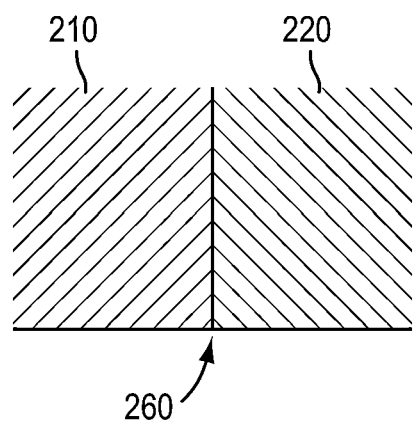
FIG. 2C is a graphic representation of two refractory components bonded together using a method according to the disclosure.

In contrast, FIG. 2C illustrates a refractory substrate manufactured according to the instant disclosure, i.e., without the use of a bonding agent. Refractory components 210 and 220 are joined without a bonding agent and do not exhibit an undesirable wear pattern such as a dip or a ridge. A joint 260 is present between the two components, but may not be visible or otherwise detectable. It is noted that the prior art methods can theoretically only achieve the corrosion profile of the instant disclosure when the bonding agent and the refractory components exhibit equal solubility in glass. Thus, by eliminating the joint caused by the presence of a bonding agent, glass forming bodies manufactured according to the instant methods may produce glass sheets with reduced streaking or, in certain embodiments, no streaking.

The methods disclosed herein may be used to bond two or more components comprised of any refractory material. For instance, the refractory components may be chosen from zircon, alumina, fused cast zirconia, or any other refractory oxides capable of sintering via atomic lattice or grain boundary diffusion. According to one embodiment, the refractory components to be bonded together are zircon components. In other non-limiting embodiments, the refractory components may be different types of the same refractory, for instance the refractory materials may comprise the same major constituent, such as zircon or alumina, but may have different grain sizes or minor constituents. By way of non-limiting example, the refractory materials may be different types of zircon refractory, with various concentrations of other species that may improve certain refractory behavior, such as creep resistance and strength. The combination of different refractory materials or different types of refractory materials is not possible when using the unitary isopressing method.

According to various embodiments, the refractory components to be bonded may be fired refractory bodies made by cold isostatically pressing inorganic refractory powders and various other ingredients and subsequently firing the resulting product. The refractory composition may comprise other starting materials conventionally utilized in ceramics, such as sintering aids and binders. The refractory components may, in certain embodiments, be fired zircon bodies. The refractory composition can contain, in addition to the major component(s), various minor components such as $TiO_2$, $SiO_2$, $Fe_2O_3$, $Y_2O_3$, $B_2O_3$, $La_2O_3$, $BaO$, $Na_2O$, $K_2O$, $Li_2O$, $CaO$, and various other trace and minor components inherent to the raw materials.

The terms "fired," "fired body," "fired component," and other variations thereof are used interchangeably herein to denote a refractory composition that has been isostatically pressed and subjected to a temperature sufficient to sinter the refractory composition. For example, the refractory components may have been fired at a temperature higher than about 1000° C., such as higher than about 1200° C., higher than about 1400° C., or higher than about 1500° C., before being bonded together according to the present disclosure.

According to various embodiments, each refractory component comprises at least one surface to be bonded, also referred to herein as a bonding surface. For instance, in the case of bonding two refractory components, each component will have a bonding surface and a distal surface. The bonding surfaces are joined together and the distal surfaces become the distal ends of the newly formed refractory substrate. When more than two refractory components are bonded together, such as three components, the two end components will have a bonding surface and a distal surface and the middle component will have two bonding surfaces. The middle component is placed between the two end components, the bonding surfaces are joined together, and the distal surfaces become the distal ends of the newly formed refractory substrate. Likewise, more than three components can be bonded together in the same fashion, by adding one or more additional middle components with two bonding surfaces in between the end components.

The surfaces to be bonded are each ground and/or polished before coming into contact with one another. In certain embodiments, the surfaces are ground/and or polished using an abrasive with a grit size that is at least as fine as the largest particle present in the components to be bonded. For example, if the largest particle size in the component to be bonded is approximately 75 microns, then the surfaces to be bonded may be polished using a grit of about 75 microns or finer. Certain coarser surface finishes may be obtained by grinding the bonding surfaces without the need for finer polishing.

According to various embodiments, the bonding surfaces may be polished using an abrasive with a grit size of about 35 microns or finer. For example, the bonding surfaces may be polished using a grit of about 25 microns or finer, about 15 microns or finer, or about 10 microns or finer. The bonding surfaces may be polished using any technique known in the art, for instance, polishing with a diamond rouge or wheel or hand polishing with SiC paper. The surfaces may, for example be ground and/or polished with abrasives of varying grit sizes in descending order so as to achieve the desired surface roughness. By way of non-limiting example, the surfaces may be ground and/or milled using a grit size of about 50 microns, followed by polishing with a diamond rouge having a grit size of about 35 microns, followed by hand polishing with SiC paper having a grit size of 20 microns or finer.

The surface roughness of the surface to be bonded may depend on various factors related to the polishing method. For instance, the grit size of the abrasive, the hardness of the abrasive, the hardness of the refractory component, and/or the load used during polishing may affect the final surface roughness obtained. As used herein, the term "surface roughness" is intended to denote the $R_a$ value, i.e., the average surface roughness. In some embodiments, the surfaces to be bonded will be polished so as to obtain a surface roughness, $R_a$, of less than about 200 nm. For example, the surface roughness may be less than about 150 nm, less than about 100 nm, less than about 50 nm, or less than about 10 nm. The surface roughness, $R_a$, can be imaged and calculated using methods well-known in the art, such as atomic force microscopy (AFM). Without wishing to be bound by theory, it is believed that the degree of contact between the surfaces to bonded increases as the surfaces are ground and/or polished to a finer finish, thus resulting in a stronger bond between the components.

The surfaces to be bonded may, in certain embodiments, be machined, ground, and/or polished such that they are substantially complimentary to each other. In other words, in this embodiment, each bonding surface is a mirror image of the opposite surface. For example, two planar surfaces to be bonded will be parallel to each other. It should be understood however, that the surfaces to be bonded together need not be planar. The term "bonding surface pair" and variations thereof are used herein to denote two bonding surfaces that are brought into contact with each other. In the case where two refractory components are to be bonded together, the two bonding surfaces may be polished such that they are parallel to one another. In the case where three components are to be bonded together, the middle component may have two different bonding surfaces, one which is parallel to the bonding surface of a first end component and one which is parallel to the bonding surface of a second end component. In this embodiment, there are two bonding surface pairs, which may have identical or different configurations. Likewise, when more than three components are bonded together, various bonding surface pair configurations are possible and within the scope of the instant disclosure.

In another embodiment, the surfaces to be bonded may have surfaces that form an interlocking joint. By way of non-limiting example, the bonding surface of one component may have a protruding portion that fits substantially within a recessed portion of another bonding surface, such as a mortise and tenon joint. In this embodiment, the bonding surfaces are polished and/or machined such that the corresponding surfaces of the joint are substantially parallel, to provide a fit that is substantially free of voids when the components are joined. As discussed above, when bonding three or more components, various bonding surface pair configurations are possible, including interlocking joints which are identical or different. It is within the ability of one skilled in the art to select the bonding surface configuration suitable for a particular application.

The term "joint" and other variations thereof is used herein to denote the interface at which two bonding surfaces are contacted and ultimately joined by firing under an applied compressive force. Prior art methods employing a bonding agent result in a visible or otherwise detectable joint comprising the bonding agent reactants. However, in certain embodiments, the "joint" of the instant application is not visible or otherwise detectable, as there is no bonding agent between the two components. Thus, the term "joint" as used herein may denote a theoretical line where two components are joined, but which is neither visible nor detectable. In some embodiments, the joint may be visible or detectable.

The refractory components may be arranged by any means suitable to effect suitable contact between the surfaces to be bonded. As used herein, the terms "direct contact," "directly contacted," and variations thereof are used interchangeably to denote that the surfaces to be bonded contact one another without any intervening component, i.e., in the absence of a bonding material or paste.

Figure 3A:
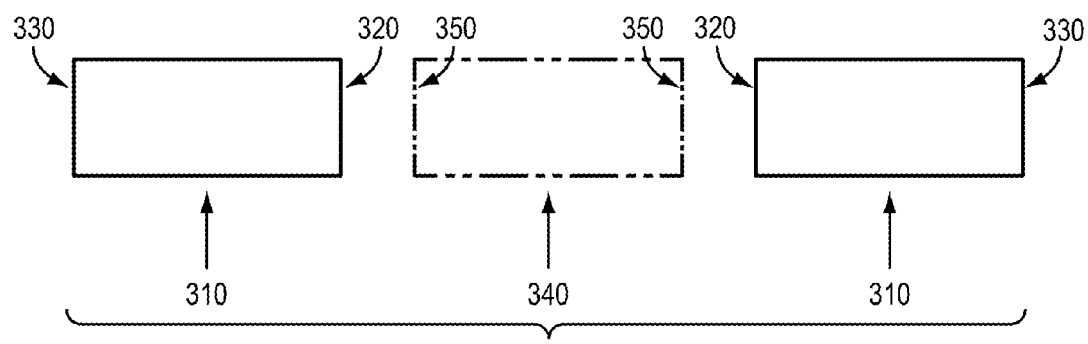
FIG. 3A is a graphic representation of two or more refractory components to be bonded together using a method according to the disclosure.

The refractory components may be horizontally arranged in an end-to-end fashion such that the surfaces to be bonded are brought into direct contact. This embodiment is illustrated in FIG. 3A, which provides a non-limiting and exemplary horizontal configuration. In the case of two components to be bonded, two end components 310 are provided, each having a proximal end 320 containing a surface to be bonded and distal end 330 opposite the proximal end 320. The end components 310 are horizontally arranged in an end-to-end fashion, bringing the proximal ends 320 together such that the surfaces to be bonded are directly contacted. Optionally, in the case of three or more components to be bonded, one or more middle components 340 are provided, each having two proximal ends 350 containing a surface to be bonded. The middle component 340 is placed between the end components 310, and the proximal ends 320 and 350 are brought together such that the surfaces to be bonded are directly contacted.

Figure 3B:
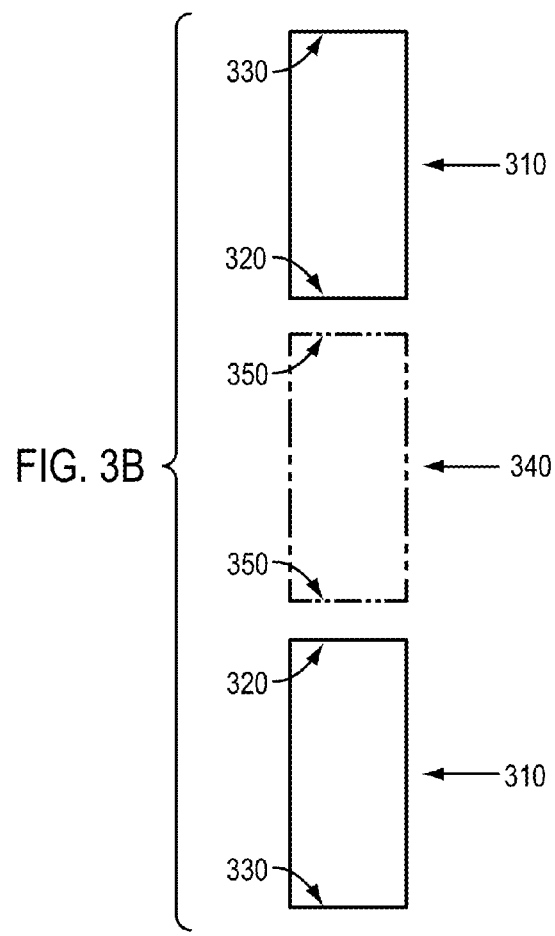
FIG. 3B is a graphic representation of two or more refractory components to be bonded together using a method according to the disclosure.

In another embodiment, the refractory components may be vertically arranged or stacked such that the surfaces to be bonded are brought into direct contact, as illustrated in FIG. 3B. In the case of two components to be bonded, two end components 310 are provided, each having a proximal end 320 containing a surface to be bonded and distal end 330 opposite the proximal end 320. The two end components 310 are vertically arranged by placing the proximal end 320 of one end component 310 over the proximal end 320 of another end component 310 such that the surfaces to be bonded are directly contacted. In the case of three or more components to be bonded, one or more middle components 340 are provided, each having two proximal ends 350 containing a surface to be bonded. The middle component 340 is placed between the end components 310, and the proximal ends 320 and 350 are brought together such that the surfaces to be bonded are directly contacted.

The refractory components which may be contacted horizontally, vertically, or in any other fashion, form an unbonded refractory substrate which may then be fired under a load. According to various embodiments, the unbonded refractory substrate is subjected to a compressive force during firing. Without wishing to be bound by theory, it is believed that the compressive force may ensure good contact between the bonding surfaces so as to promote refractory crystal growth across the joint, which will yield a strong bond between the refractory components. The compressive force can be applied in various ways. In certain embodiments, the compressive force may be applied in a direction perpendicular to the surfaces to be bonded.

By way of non-limiting example, when the refractory components are vertically stacked to form an unbonded refractory substrate, the compressive force may be supplied by the force of gravity alone, i.e., by the weight of the top component(s). In another embodiment, one or more weights may optionally be applied to a distal end of the unbonded substrate. In this embodiment, gravity provides at least a part of the compressive force exerted on the surfaces to be bonded. For example, a weight may be placed on the distal end so as to exert an additional pressure on the surfaces to be bonded of approximately 10 kPa. Alternatively, a compressive force may be applied via mechanical means, for instance, via an external hydraulic press. According to various embodiments, the total compressive force, taking into account the weight of the top component(s) and any additionally applied weight and/or force, is sufficient to exert a total pressure on the surfaces to be bonded ranging from about 650 kPa to about 3,500 kPa, for example, from about 1,000 kPa to about 2,000 kPa.

In another embodiment, when the refractory components are arranged in an end-to-end horizontal fashion to form an unbonded refractory substrate, a compressive force may be applied to at least one of the distal ends of the substrate. For example, a clamp, screw, or other suitable device may be used to apply a compressive force to at least one distal end of the substrate. The compressive force may be any force sufficient to promote adequate bonding at the surface interface. In certain embodiments, the compressive force is sufficient to exert a pressure on the surfaces to be bonded ranging from about 650 kPa to about 3,500 kPa, or from about 1,000 kPa to about 2,000 kPa.

When a weight or other mechanical device such as a clamp is applied to one or both distal ends of the unbonded refractory substrate it may be desirable, in certain embodiments, to place a chemically inert or non-reactive material between the substrate and the weight and/or device. By way of non-limiting example, a thin piece of Pt foil may be placed between the substrate and the weight and/or device.

The unbonded refractory substrate may be subjected to the compressive force either before it is placed in the furnace for firing or after it has been placed in the furnace, but before firing. The unbonded refractory substrate is then fired at a temperature and for a time sufficient to sinter the unbonded substrate and effect bonding between the individual refractory components at the bonding surfaces. According to various embodiments, the unbonded refractory substrate is fired at a temperature of at least about 1200° C. for a time of at least about 12 hours. The firing temperature, according to various embodiments, will vary depending on the refractory material and/or the desired length of the firing cycle.

For example, in the case of zircon components, the unbonded substrate may be fired at a temperature of at least about 1500° C., at least about 1580° C., or at least about 1600° C. In other embodiments, such as in the case of alumina components, the unbonded refractory substrate may be fired at a temperature of at least about 1200° C., at least about 1300° C., or at least about 1400° C. It is within the ability of one skilled in the art to select the appropriate firing temperature based on the refractory material, firing time, and/or desired application. The unbonded refractory substrate may be fired for time of at least about 12 hours, for example, at least about 20 hours, at least about 48 hours, at least about 60 hours, or at least about 120 hours.

After firing is complete, the refractory components should be bonded together to form a unitary refractory substrate. In some embodiments, the bonded refractory substrate may have an MOR strength that is approximately equal to the MOR of an unbonded piece of the same refractory material. In other embodiments, the bonded refractory substrate may have an MOR strength that is higher than the MOR of an unbonded piece of the same refractory material. MOR strength may be determined, for example, by testing the refractory substrates using the four-point bending test, as set forth in ASTM C1674-11.

The instant disclosure also relates to a method for making a zircon substrate by bonding together a plurality of zircon components, each component having at least one surface to be bonded, the method comprising (a) polishing each surface to be bonded to a surface roughness ($R_a$) of 200 nm or finer, (b) directly contacting the surfaces to be bonded to form an unbonded zircon substrate, (c) firing the unbonded zircon substrate, and (d) subjecting the surfaces to be bonded to a compressive force during firing. It is to be understood that the methods for making a refractory substrate disclosed herein and all the various embodiments related thereto are equally applicable to the methods of making a zircon substrate. It is within the ability of one skilled in the art to interchange and/or modify the various embodiments disclosed herein to make a zircon substrate. Likewise, it is also within the ability of one skilled in the art to modify the various embodiments disclosed herein to make any substrate from a specific refractory material, such as alumina.

In certain embodiments, the bonded refractory substrate may be subjected to post-bonding finishing to produce an end product, such as a forming body, trough, or any other desired ceramic article. Such post-bonding finishing may include, for example, machining, surface grinding, and/or polishing. The refractory substrate may be machined into any desired shape or size. The surfaces of the end product may optionally be further ground and/or polished to ensure a smooth surface over which glass can flow evenly. Other post-bonding finishing processes are envisioned by and within the scope of the instant disclosure.

A forming body, such as for use in the manufacture of glass substrates, may be manufactured according to the instant disclosure using various configurations of refractory components. For example, in the embodiment illustrated in FIGS. 4A-C, refractory components 405 are horizontally contacted in an end-to-end fashion to form vertical joints 415, and the refractory substrate thus formed is subsequently machined into the shape of forming body 400. The machined forming body 400 comprises an upper trough 410, upper trough walls 420, a trough bottom 430, a bottom portion having a wedge-shaped cross-section 440, and two major side surfaces 450 sloping downwardly to join at a root 460. Glass 470 flows over the trough walls 420, down the side surfaces 450 and converges at the root 460.

Figure 4A:
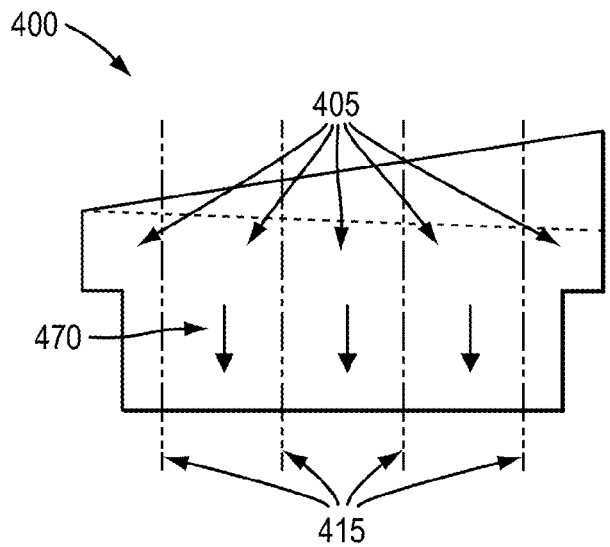
FIG. 4A is a side view of a forming body manufactured using a method according to the disclosure.
Figure 4C:
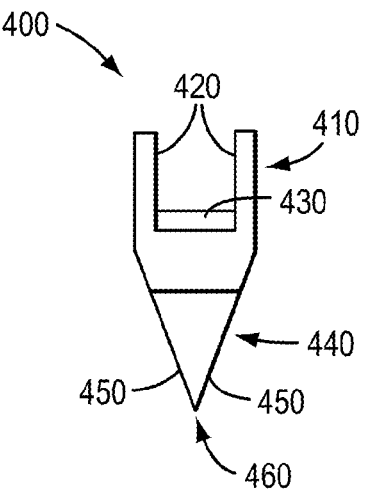
FIG. 4C is an end view of a forming body manufactured using a method according to the disclosure.
Figure 4B:
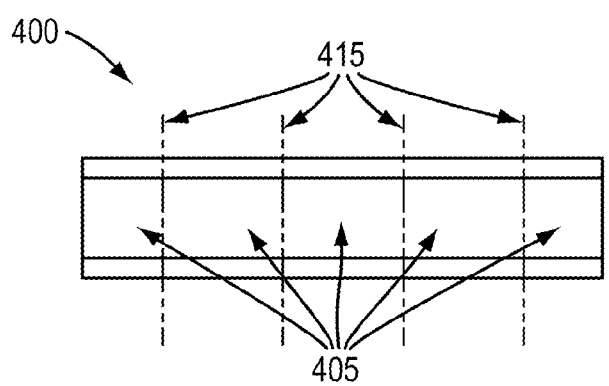
FIG. 4B is a top view of a forming body manufactured using a method according to the disclosure.

In this embodiment, refractory components 405 are placed side-by-side until a refractory substrate of the desired dimension is achieved. When a forming body is machined from a refractory substrate thus formed, the joints are theoretically "visible" from the side view (FIG. 4A) and the top view (FIG. 4B), but not from the end view (FIG. 4C). One advantage of the vertical joint configuration is the ability to use smaller individual components. It should be noted that while FIGS. 4A-C illustrate a forming body 400 comprising five refractory components 405, with relatively evenly spaced and parallel vertical joints 415, this configuration is exemplary only. Any number of refractory components of varying sizes and with varying bonding surface configurations may be used in the manufacture of a forming body in accordance with the present disclosure.

Figure 5A:
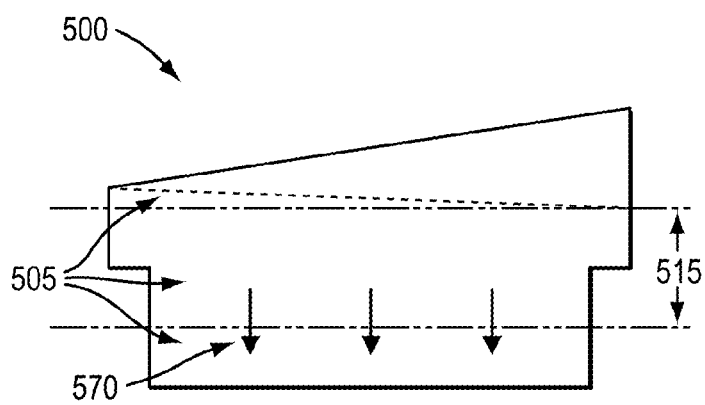
FIG. 5A is a side view of a forming body manufactured using a method according to the disclosure.
Figure 5C:
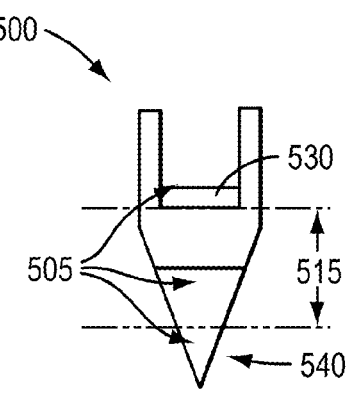
FIG. 5C is an end view of a forming body manufactured using a method according to the disclosure.
Figure 5B:
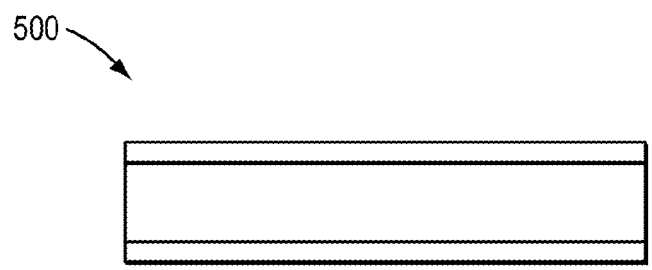
FIG. 5B is a top view of a forming body manufactured using a method according to the disclosure.

In another embodiment, as illustrated in FIGS. 5A-C, the forming body 500 may comprise a plurality of refractory components 505, which are vertically contacted to form horizontal joints 515. In this embodiment, the proximal end of one refractory component is placed over a proximal end of another refractory component, with additional components being similarly vertically contacted until a refractory substrate of the desired dimension is achieved. When a forming body is machined from a refractory substrate thus formed, the joints are theoretically "visible" from the side view (FIG. 5A) and the end view (FIG. 5C), but not from the top view (FIG. 5B).

The horizontal joint configuration may require relatively larger refractory components as compared to the vertical joint configuration, as the refractory components must have a length at least equal to the desired length of the forming body. However, in the case of joint wear and/or corrosion after a length of use, the effect may be less noticeable when horizontal joint configuration is employed, at least because the effect will be spread out over the entire length of the surface upon which glass 570 flows. Any wear effect on the resulting glass sheet may thus be less detectable. It should be noted that, while FIGS. 5A-C illustrate a forming body 500 comprising three refractory components 505, with relatively evenly spaced and parallel horizontal joints 515 that intersect the forming body 500 at the trough bottom 530 and the bottom portion 540, this configuration is exemplary only. Any number of refractory components of varying sizes and with varying bonding surface configurations may be used in the manufacture of a forming body in accordance with the present disclosure and the horizontal joints may intersect the forming body at any location.

FIGS. 6A-C illustrate a further embodiment of the disclosure, wherein a forming body 600 comprises a plurality of refractory components 605, which are horizontally contacted to form slanted joints 615. In this embodiment, refractory components 605 are placed side-by-side, contacting the parallel slanted bonding surfaces, until a refractory substrate of the desired dimension is achieved. When a forming body is machined from a refractory substrate thus formed, the joints are theoretically "visible" from the side view (FIG. 6A) and the top view (FIG. 6B), but not from the end view (FIG. 6C).

Similar to the horizontal joint configuration, any potential joint wear and/or corrosion will produce a less noticeable effect because the effect will be spread out over a larger area of the forming body and, thus, the resulting glass sheet. The slanted joint configuration may also allow for the use of relatively smaller refractory components. It should be noted that, while FIGS. 6A-C illustrate a forming body 600 comprising five refractory components 605, with relatively evenly spaced slanted joints 615, which are each parallel to each other, this configuration is exemplary only. Any number of refractory components of varying sizes and with varying bonding surface configurations may be used in the manufacture of a forming body in accordance with the present disclosure.

While FIGS. 4-6 illustrate a forming body having a conventional shape, it is to be understood that any forming body of any varying shape or dimension may be produced from the bonded refractory substrates of the instant disclosure. Still further, any ceramic article, such as a trough, may be machined to any desired shape or size from a bonded refractory substrate of the instant disclosure.

Figure 7:
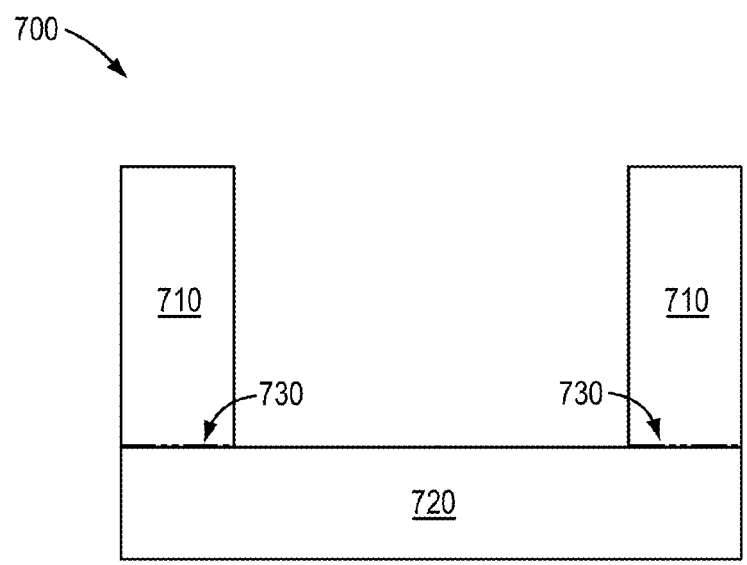
FIG. 7 is an end view of a forming body manufactured using a method according to the disclosure.

For instance, FIG. 7 depicts a forehearth trough 700, which may be manufactured from several refractory components by bonding two trough walls 710 to a trough bottom 720. Joints 730 are formed where the trough walls 710 meet the trough bottom 720. It is to be understood that, while FIG. 7 illustrates two trough walls 710 arranged vertically on top of the trough bottom 720, it is also possible to horizontally arrange the trough bottom 720 between the trough walls 710. Other arrangements are envisioned and part of the instant disclosure. The forehearth trough configuration provides the advantage of a decreased number of joints while also providing savings in the time and costs associated with machining and a reduction in the potential for manufacturing defects, such as undesirable voids between the bonded refractory components.

Combinations of the various joint configurations described above are also within the scope of this disclosure. It is within the ability of one skilled in the art to select any combination of joints suitable to a desired application, whether making a forming body or a ceramic article of different dimensions. Similarly, other variations on the configuration, dimension, and orientation of the glass forming body will be readily apparent to one of ordinary skill in the art and are within the scope and spirit of the disclosure.

EXAMPLES

Various embodiments will be further clarified by the following non-limiting examples.

Several bonded zircon substrates were produced using various combinations of two different types of zircon (Zircon A and Zircon B). In each case, a zircon substrate was produced from two fired zircon components having an approximate dimension of 11.43 cm×5.08 cm×3.81 cm. The bonding surface (the 11.43 cm×3.81 cm side) of each block was polished using a diamond wheel followed by hand polishing with SiC papers having progressively finer grits, beginning with a P360 grit (40.5 microns), followed by P800 (25.8 microns) and P1200 (15.3 microns). After polishing, the components were ultrasonically cleaned for approximately 15 minutes and dried overnight in a drying oven operating at about 120° C. The zircon components were vertically stacked, a thin piece of Pt foil and a weight of approximately 20 g were placed on top (on a distal end) of the stacked components, and the unbonded substrates thus formed were fired at approximately 1580° C. No bonding material was used between the two zircon components.

The firing time varied among the tested samples. The Zircon A-A substrate was fired for about 12 hours, the Zircon A-B substrate was fired for about 48 hours, and the Zircon B-B substrate was fired for about 120 hours. The resulting bonded zircon substrates were then machined to produce approximately 10 smaller substrates of substantially identical dimension (approximately 1.27 cm×0.63 cm×11.43 cm), each having the bonded joint at approximately the midpoint of the length (11.43 cm) of the substrate. The machined substrates were then subjected to a four-point bending test at room temperature. The MOR strength of the bonded zircon substrates was compared to the MOR of unbonded zircon substrates made of Zircon A and Zircon B and having approximately the same dimension as the bonded zircon substrates.

Table I below provides the results of the MOR four-point bending test. The bonded Zircon B-B substrate, fired for approximately 120 hours, demonstrated an MOR strength higher than that of either the unbonded Zircon A or Zircon B substrate. Similarly, the bonded Zircon A-B substrate, fired for about 48 hours, demonstrated an MOR strength approximately equal to that of the unbonded Zircon A and Zircon B substrate. The bonded Zircon A-A substrate, fired for about 12 hours, demonstrated an acceptable MOR strength; however, the measured MOR strength was less than that of the unbonded Zircon A and Zircon B substrates. Thus, without wishing to be bound by theory, it is possible that the firing time may affect the MOR strength of the resulting bonded substrate. In some embodiments, a longer firing time may result in a stronger bond.

TABLE I

| | Average MOR Strength | | | | |
|---|---|---|---|---|---|
| | Zircon A | Zircon B | Zircon B-B 1580° C. 120 hrs | Zircon A-B 1580° C. 48 hrs | Zircon A-A 1580° C. 12 hrs |
| Average MOR Strength (MPa) | 132.0 | 130.8 | 135.6 | 126.7 | 89.3 |

Table II shows a summary of the location of the failure (breaking point) for each bonded zircon substrate tested. The Zircon A-A samples demonstrated not only the lowest MOR strength, but also all of the failures in Zircon A-A occurred at the bond, rather than in the substrate.

TABLE II

| | Location of Failure of Bonded Substrates | | |
|---|---|---|---|
| | Zircon B-B 1580° C., 120 hrs | Zircon A-B 1580° C., 48 hrs | Zircon A-A 1580° C., 12 hrs |
| Number of Failures at Bond | 2 | 7 | 9 |
| Number of Failures at Substrate | 7 | 5 (failure in substrate A) | 0 |
| Total Number of Samples | 9 | 12 | 9 |

Figure 8A:
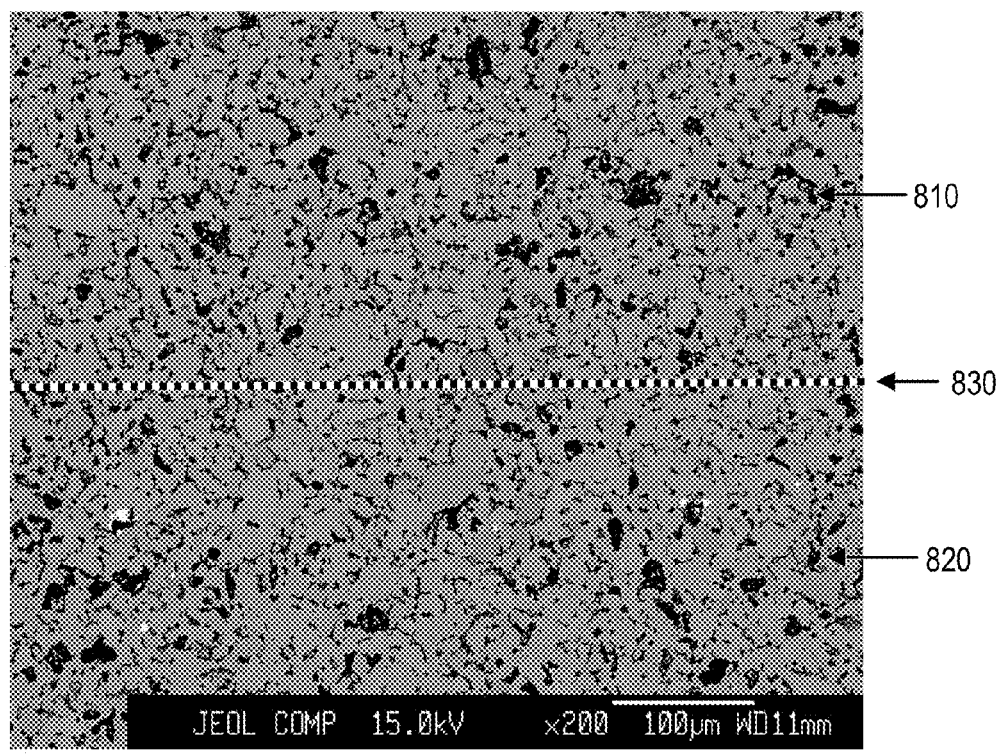
FIG. 8A is a backscattered electron image of two zircon components bonded together using a method according to the disclosure.

FIG. 8A shows an SEM image (magnification×200) of a bonded pair of zircon components 810 and 820 (Zircon A-A), polished using a diamond wheel followed by polishing with diamond film having a grit size of approximately 35 microns, and fired at approximately 1580° C. for about 48 hours, without the use of a bonding agent. The joint between the two components is shown with a dotted line 830. Without the addition of this line to the SEM image, it is very difficult to see the joint of the two separate pieces of zircon, even under magnification. The zircon grains have grown across the interface, resulting in a microstructure that is substantially uniform across the boundary.

Figure 8B:
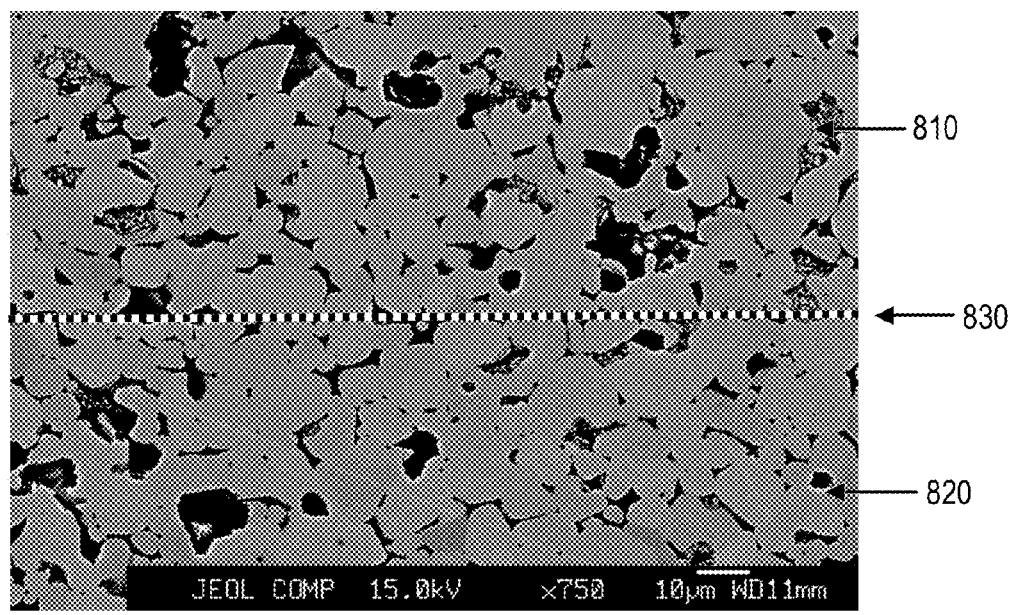
FIG. 8B is a backscattered electron image of two zircon components bonded together using a method according to the disclosure.

FIG. 8B shows a higher magnification SEM image (magnification×750) of the same sample. Again, the joint between the two components 810 and 820 is illustrated by a dotted line 830. Larger single grains located on both sides of the line indicate that grain growth has occurred at the interface of the two substrates, forming a strong bond.

Figure 9A:
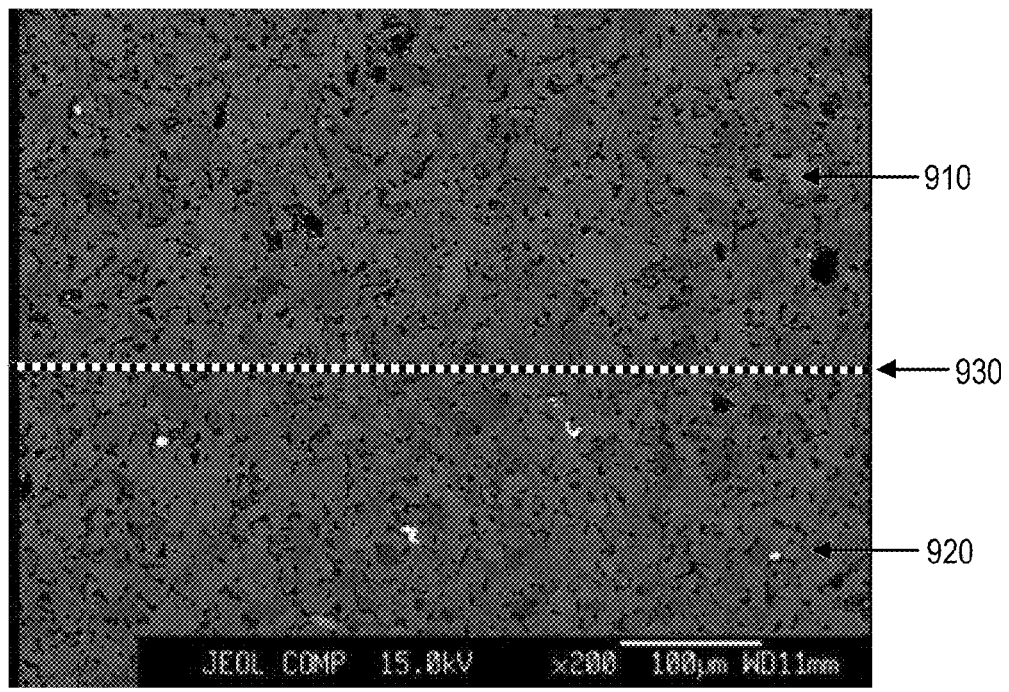
FIG. 9A is a backscattered electron image of two zircon components bonded together using a method according to the disclosure.

FIG. 9A shows an SEM image (magnification×200) of a bonded pair of zircon components 910 and 920 (Zircon A-A), polished using a diamond wheel followed by polishing with diamond films having progressively finer grits (approximately 35, 9, 6, and 3 microns), and fired at approximately 1580° C. for about 48 hours, without the use of a bonding agent. The joint between the two components is shown with a dotted line 930. Without the addition of this line to the SEM image, it is very difficult to see the joint of the two separate pieces of zircon, even under magnification. The zircon grains have grown across the interface, resulting in a microstructure that is substantially uniform across the boundary.

Figure 9B:
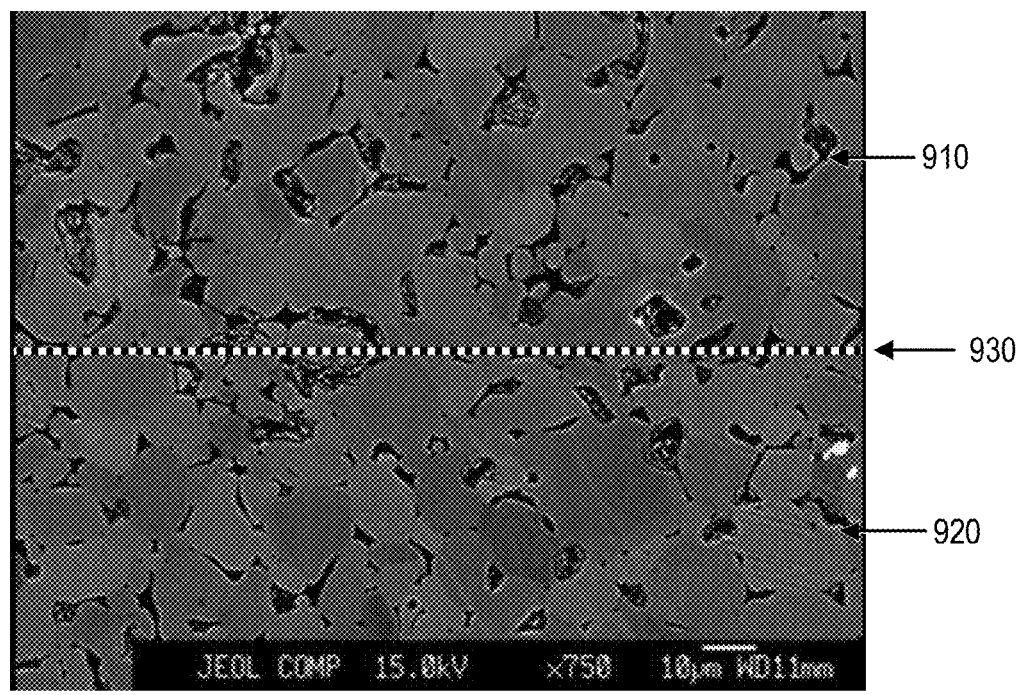
FIG. 9B is a backscattered electron image of two zircon components bonded together using a method according to the disclosure.

FIG. 9B shows a higher magnification SEM image (magnification×750) of the same sample. Again, the joint between the two components 910 and 920 is illustrated by a dotted line 930. Grain growth has occurred across the interface of the two substrates and can easily be seen as larger single grains that are located on both sides of the line. Grain growth at the interface indicates the formation of a strong bond. It is noted that the grain growth across the interface appears to be more pronounced in FIG. 9B (3 micron grit) than in FIG. 8B (35 micron grit). Without wishing to be bound by theory, it is believed that surface roughness is reduced by polishing with a finer grit, which increases the degree of contact between the surfaces to be bonded, which in turn increases the degree of grain growth across the interface.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is to be understood that the foregoing description is exemplary and explanatory only, and is not to be interpreted as restrictive of the disclosure. Moreover, it should be understood that various features and/or characteristics of differing embodiments herein may be combined with one another. Therefore modifications and variations may be made to the illustrative embodiments and other arrangements may be devised without departing from the spirit or scope of the invention. Since modifications combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method for bonding together a plurality of refractory components, each having at least one surface to be bonded, the method comprising:
   (a) polishing each surface to be bonded to a surface roughness Ra of 200 nm or finer;
   (b) directly contacting the surfaces to be bonded to form an unbonded refractory substrate;
   (c) firing the unbonded refractory substrate;
   (d) subjecting the surfaces to be bonded to a compressive force during firing; and
   wherein the refractory components are chosen from the group consisting of zircon components, alumina components, and fused cast zirconia components and the unbonded refractory substrate is fired at a temperature and for a time sufficient to sinter the refractory components and effect bonding at the surfaces.

2. The method of claim 1, wherein the surfaces to be bonded are polished to a surface roughness Ra of 100 nm or finer.

3. The method of claim 1, wherein the surfaces to be bonded are milled, ground, and/or polished such that the surfaces to be bonded are substantially complimentary to each other.

4. The method of claim 1, wherein the refractory components have interlocking surfaces to be bonded.

5. The method of claim 1, wherein the compressive force is applied in a direction perpendicular to the surfaces to be bonded.

6. The method of claim 1, wherein at least a first refractory component and a second refractory component are bonded together, each of the first and second refractory components having a proximal end containing a surface to be bonded and a distal end opposite the proximal end; the proximal end of the first refractory component is placed vertically over the proximal end of the second refractory component such that the surfaces to be bonded are directly contacted; optionally, one or more third refractory components, each having two proximal ends containing a surface to be bonded, are placed between the first and second refractory components such that the surfaces to be bonded are directly contacted; and the compressive force is applied to at least the distal end of the first refractory component.

7. The method of claim 1, wherein at least a first refractory component and a second refractory component are bonded together, each of the first and second refractory components having a proximal end containing a surface to be bonded and a distal end opposite the proximal end;
   the proximal end of the first refractory component and the proximal end of the second refractory component are horizontally arranged in an end-to-end fashion such that the surfaces to be bonded are directly contacted;
   optionally, one or more third refractory components, each having two proximal ends containing a surface to be bonded, are placed between the first and second refractory components such that the surfaces to be bonded are directly contacted; and
   wherein the compressive force is applied to at least the distal ends of the first and second refractory components.

8. The method of claim 1, wherein the unbonded refractory substrate is fired at a temperature of at least 1200° C.

9. The method of claim 1, wherein the unbonded refractory substrate is fired for a time of at least 12 hours.

10. A method for bonding together a plurality of zircon components, each having at least one surface to be bonded, the method comprising:
    (a) polishing each surface to be bonded to a surface roughness Ra of 200 nm or finer;
    (b) directly contacting the surfaces to be bonded to form an unbonded zircon substrate;
    (c) firing the unbonded zircon substrate;
    (d) subjecting the surfaces to be bonded to a compressive force during firing; and wherein the unbonded zircon substrate is fired at a temperature and for a time sufficient to sinter the zircon components and effect bonding at the surfaces.

11. The method of claim 10, wherein the surfaces to be bonded are polished to a surface roughness Ra of 100 nm or finer.

12. The method of claim 10, wherein the surfaces to be bonded are milled, ground, and/or polished such that the surfaces to be bonded are substantially complimentary to each other.

13. The method of claim 10, wherein the zircon components have interlocking surfaces to be bonded.

14. The method of claim 10, wherein the compressive force is applied in a direction perpendicular to the surfaces to be bonded.

15. The method of claim 10, wherein at least a first zircon component and a second zircon component are bonded together, each of the first and second zircon components having a proximal end containing a surface to be bonded and a distal end opposite the proximal end;
- the proximal end of the first zircon component is placed vertically over the proximal end of the second zircon component such that the surfaces to be bonded are directly contacted;
- optionally, one or more third zircon components, each having two proximal ends containing a surface to be bonded, are placed between the first and second zircon components such that the surfaces to be bonded are directly contacted; and
- the compressive force is applied to at least the distal end of the first zircon component.

16. The method of claim 10, wherein at least a first zircon component and a second zircon component are bonded together, each of the first and second zircon components having a proximal end containing a surface to be bonded and a distal end opposite the proximal end;
- the proximal end of the first zircon component and the proximal end of the second zircon component are horizontally arranged in an end-to-end fashion such that the surfaces to be bonded are directly contacted;
- optionally, one or more third zircon components, each having two proximal ends containing a surface to be bonded, are placed between the first and second zircon components such that the surfaces to be bonded are directly contacted; and
- the compressive force is applied to at least the distal ends of the first and second zircon components.

17. The method of claim 10, wherein the unbonded zircon substrate is fired at a temperature of at least 1500° C.

18. The method of claim 10, wherein the unbonded zircon substrate is fired for a time of at least 12 hours.

19. A method for making a refractory forming body, the method comprising:
(a) preparing a refractory substrate by bonding together a plurality of refractory components, each having at least one surface to be bonded, wherein the bonding comprises:
  (i) polishing each surface to be bonded to a surface roughness Ra of 200 nm or finer;
  (ii) directly contacting the surfaces to be bonded to form an unbonded refractory substrate;
  (iii) firing the unbonded refractory substrate; and
  (iv) subjecting the surfaces to be bonded to a compressive force during firing; wherein the unbonded refractory substrate is fired at a temperature and for a time sufficient to sinter the refractory components and effect bonding at the surfaces;
(b) machining the refractory substrate into a desired shape and dimension to form the refractory forming body; and
wherein the refractory components are chosen from zircon components and alumina components.

20. A method for bonding together a plurality of refractory components, each having at least one surface to be bonded, the method comprising:
(a) polishing each surface to be bonded to a surface roughness Ra of 200 nm or finer;
(b) directly contacting the surfaces to be bonded to form an unbonded refractory substrate;
(c) firing the unbonded refractory substrate;
(d) subjecting the surfaces to be bonded to a compressive force during firing; and
wherein the refractory components are chosen from the group consisting of zircon components, alumina components, and fused cast zirconia components, the unbonded refractory substrate is fired at a temperature and for a time sufficient to sinter the refractory components and effect bonding at the surfaces, and the compressive force is from about 650 kPa to about 3,500 kPa.

21. The method of claim 20, wherein the compressive force is from about 1,000 kPa to about 2000 kPa.

22. The method of claim 20, wherein the unbonded refractory substrate is fired at a temperature of at least 1200° C.

23. The method of claim 20, wherein the unbonded refractory substrate is fired for a time of at least 12 hours.

* * * * *